United States Patent

[11] 3,557,941

[72] Inventor Ian M. Thomson
 Crowthorne, England
[21] Appl. No. 772,946
[22] Filed Nov. 4, 1968
[45] Patented Jan. 26, 1971
[73] Assignee Solar Thomson Engineering Company
 Limited
 Camberley, Surrey, England
[32] Priority Nov. 7, 1967
[33] Great Britain
[31] 50649/67

[54] CONVEYOR BELT
 10 Claims, 1 Drawing Fig.
[52] U.S. Cl. .................................................. 198/193,
 198/201
[51] Int. Cl. .................................................. B65g 15/30,
 B65g 15/40

[50] Field of Search ........................................... 198/193,
 201; 74/237

[56] References Cited
 UNITED STATES PATENTS
 932,015 8/1909 Heaton ........................ 198/193

Primary Examiner—Edward A. Sroka
Attorney—Stevens, Davis, Miller & Mosher

ABSTRACT: A self-troughing conveyor belt made of flexible material comprising a series of laterally extending reinforcing members embedded therein, each reinforcing member comprising three metal strips disposed in end to end relationship in a nylon tube whereby the ends of the metal strips are restrained from breaking through the belt due to relative movement between the strips.

PATENTED JAN 26 1971
3,557,941
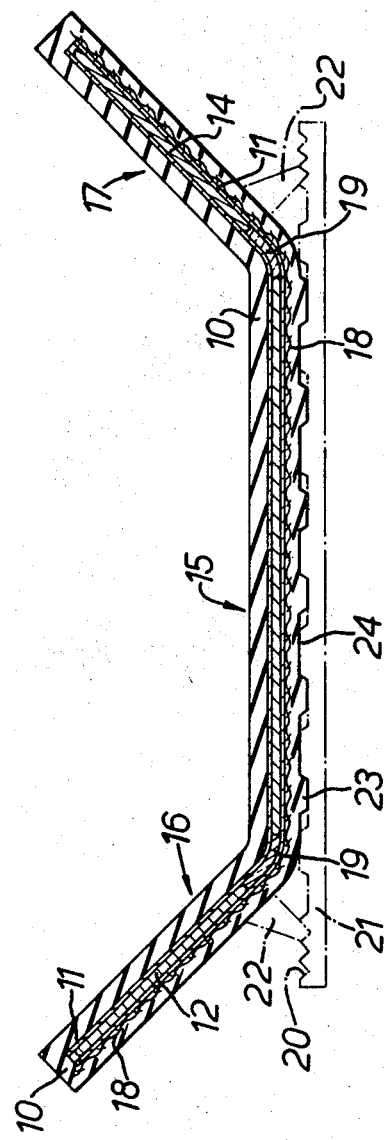
INVENTOR
IAN M. THOMSON
By Stevens, Davis, Miller & Mosher
ATTORNEYS

3,557,941

CONVEYOR BELT

This invention is concerned with conveyor belts of the kind made of flexible material, e.g. natural or synthetic rubber.

Our copending U.S. Pat. application No. 720,189 describes a conveyor belt of that kind in which means are provided for troughing the conveyor belt on its upper run and in which laterally extending reinforcing members are provided embedded in the belt. The reinforcing members may be arranged as transverse sets of reinforcing elements so as to permit said troughing. However, relative angular movement of the elements of each set as they pass round the conveyor, tends to cause the adjacent ends of those elements to break through and damage the material of the belt. It is an object of the present invention to provide means for combating this tendency.

According to the invention, there is provided a conveyor belt made of flexible material and having a plurality of laterally extending reinforcing members embedded therein, each reinforcing member comprising a plurality of reinforcing elements disposed in end-to-end relationship and interconnected by flexible belt-protecting means covering at least adjacent ends of said elements.

The reinforcing elements preferably comprise metal strips or rods, advantageously spaced apart from one another.

The protecting means may comprise a tube completely covering the lengths of the elements. Advantageously flexible distance pieces are provided in the tube between the elements. Alternatively, the protecting means may be moulded around the elements to enclose them completely. Preferably the protecting means is made from a suitable plastics material, e.g. nylon.

For a better understanding of the invention, reference will now be made, by way of example, to the accompanying drawing in which the single FIG. is a transverse section through one embodiment.

In the FIG. there is shown a troughed conveyor belt 10 made of natural or synthetic rubber in which is embedded a laterally extending reinforcement member comprising a flexible nylon tube 11 in which three metal rods 12, 13 and 14 are arranged. The belt can be considered to have three portions, viz. a central portion indicated at 15 and two wing portions indicated at 16 and 17. Also embedded in the belt, and forming part thereof, is a layer of fabric 18.

The rods extend within the tube along a major part of the length of each respective belt portion in which they are situated, but are spaced from one another at the junction of the wing portions with the central portion so that there is a short length of hollow tube at these two points. The metal rods 12, 13 and 14 are rigid relatively to the nylon tube 11. By this construction, the wing portions are thus in effect hinged to the central position.

Preferably, two lengths of nylon rod 19 of the same diameter as the metal rods are inserted between the metal rods, thus acting as distance pieces to locate the metal rods and also strengthening the hinge.

The illustrated reinforcement member is formed by inserting the three rods and the two distance pieces into an appropriate length of tube. In an alternative construction to that illustrated, the rods are moulded in position in a rodlike mass of synthetic plastics material.

A plurality of such reinforcement members is spaced along the conveyor belt. In this way both the central and wing portions of the conveyor belt are reinforced by the rods, while the nylon covering, being tougher than the material of the belt, resists any tendency of the ends of the rods to break through and damage the fabric or covers (i.e. top and bottom layers) of the belt and thereby protects the belt.

The reinforcement member is particularly useful for reinforcing self troughing conveyor belts such as those described in our copending application 720,189.

Thus the conveyor belt may be provided with longitudinally extending ribs 23 which engage similar rib 24 provided on a drive belt 21 (shown in dotted lines), the conveyor belt also being provided with downwardly and outwardly protruding projections or support shoes 22 (also indicated in dotted lines) which engage in grooves 20 in the drive belt so as to support the wing portions of the conveyor belt whereby the conveyor belt assumes a troughed configuration. However conveyor belts according to the invention may be used in other conveyor systems, e.g. those in which troughing is effected by inclined idler rollers.

We claim:

1. A conveyor belt made of flexible material and having a plurality of laterally extending reinforcing members embedded therein, application reinforcing comprising a plurality of reinforcing elements disposed in end-to-end relationship and interconnected by flexible belt-protecting means covering at least adjacent ends of said elements.

2. A conveyor belt according to claim 1, wherein the elements of each reinforcing member are spaced apart from one another.

3. A conveyor belt according to claim 1, wherein the reinforcing elements comprise metal strips or rods.

4. A conveyor belt according to claim 1, wherein said protecting means comprises a cover containing said elements.

5. A conveyor belt according to claim 4, wherein the cover comprises a tube.

6. A conveyor belt according to claim 5, wherein the elements of each reinforcing member are spaced apart from one another and flexible distance pieces are provided in the tube between the elements.

7. A conveyor belt according to claim 1, wherein the protecting means is moulded around said elements.

8. A conveyor belt according to claim 1, wherein the elements of each reinforcing member are covered over their whole length by said protecting means.

9. A conveyor belt according to claim 1, wherein said elements comprise a central element disposed between two wing elements.

10. A belt conveyor having an endless conveyor belt according to claim 1, at least one endless drive belt in frictional driving engagement with the inner surface of the conveyor belt at least along the load-carrying flight thereof, and support means for supporting the conveyor belt in a troughed configuration, which support means travel with the conveyor belt at least along the load carrying flight thereof.